Feb. 5, 1963  S. DICKFELDT ET AL  3,076,860
BATTERY ARRANGEMENT
Filed Dec. 16, 1959

INVENTORS
Siegfried Dickfeldt
Rolf Dieberg
BY
Michael S. Striker
Attorney

Feb. 5, 1963  S. DICKFELDT ET AL  3,076,860
BATTERY ARRANGEMENT
Filed Dec. 16, 1959  2 Sheets-Sheet 2

INVENTORS:
Siegfried Dickfeldt
Rolf Dieberg
BY
Michael S. Striker
Attorney

United States Patent Office 3,076,860
Patented Feb. 5, 1963

3,076,860
BATTERY ARRANGEMENT
Siegfried Dickfeldt, Ennepetal-Milspe, and Rolf Dieberg, Hagen-Haspe, Germany, assignors to Accumulatoren Fabrik A.G., Hagen (Westphalia), Germany
Filed Dec. 16, 1959, Ser. No. 860,038
Claims priority, application Germany Dec. 19, 1958
14 Claims. (Cl. 136—24)

The present invention relates to a battery arrangement and more particularly, it relates to an alkaline storage battery arrangement, i.e. to a storage battery containing an alkaline electrolyte, positive active mass, in most cases also negative active mass, and electrically conductive terminal leads.

In its most simple form, a storage battery consists of a positive electrode, a negative electrode and a separator spacing the positive electrode from the negative electrode.

In hermetically sealed batteries, the electrodes of opposite polarity are separated from each other by a porous or absorbent separator, and the electrolyte is fixed by capillary action in the pores of the electrode and of the separator.

Such batteries having a positive electrode, a separator and a negative electrode and in which the electrolyte is fixed by capillary action, are subject to the danger that— if an insufficient quantity of electrolyte is present—the major portion of the electrolyte will adhere to the electrodes and, consequently, the remaining quantity of electrolyte will not suffice to substantially fill the pores of the separator. If the separator thus contains an insufficient quantity of electrolyte, the cell will not function properly, or in an extreme case, might not operate at all.

It is an object of the present invention to simplify the basic or most simple battery arrangement and thereby also avoid the risk of malfunction which is existent in the prior art batteries with porous separators when an insufficient quantity of electrolyte is supplied to the separator.

It is a further object of the present invention to provide a battery arrangement of great simplicity and economy.

It is yet another object of the present invention to provide a battery arrangement, particularly suitable for alkaline storage batteries in which the electrolyte is fixed by capillary action, which battery arrangement according to the present invention can be assembled without requiring the introduction of a separator as a distinct structural element.

Other objects and advantages of the present invention will become apparent from a further reading of the description and of the appended claims.

With the above and other objects in view, the present invention contemplates in an alkaline storage battery, in combination, a pair of electrodes of opposite polarity each of the electrodes including active mass and the active masses of the positive and negative electrodes contacting each other, whereby upon charging of the battery an insulating layer will be formed in the area of contact of the positive and negative active masses, the insulating layer serving as separator between the electrodes of opposite polarity during operation of the battery.

According to a preferred embodiment, the present invention includes a hermetically sealed alkaline storage battery, comprising, in combination, a hermetically sealed housing, positive and negative electrodes located in the housing adjacent to each other, each of the positive and negative electrodes including porous active mass and a terminal lead means for passing electric current from and to the electrode, an alkaline electrolyte fixed in the pores of the active masses of the positive and negative electrodes, each of the active masses of the positive and negative electrodes consisting of a main portion spaced from the active mass of the electrode of opposite polarity and of a terminal portion, the main portion of at least one of the active masses including current conducting nickel flakes dispersed therethrough and the terminal portions of the active masses being free of the current conducting nickel flakes, the terminal portions of the active masses of the positive and negative electrodes contacting each other so that upon charging of the battery an insulating layer will be formed in the area of contact of the positive and negative active masses, the insulating layer serving as separator between the electrodes of opposite polarity.

According to another embodiment of the present invention, the same includes an alkaline storage battery, comprising, in combination, a housing, positive and negative terminal lead means spaced from each other and at least partially located within the housing, an active mass located in the housing and contacting the spaced positive and negative terminal lead means, the active mass being porous and consisting of a mixture of $Ni(OH)_2$ and $Cd(OH)_2$, an alkaline electrolyte fixed in the pores of the active mass, whereby upon charging of the battery the portion of the active mass in the vicinity of the positive terminal lead means will be transformed into $NiOOH$ and $Cd(OH)_2$, the portion in the vicinity of the negative terminal lead means will be transformed into $Ni(OH)_2$ and $Cd$, and an insulating layer consisting essentially of $Cd(OH)_2$ and $Ni(OH)_2$ will remain located between the portions so as to separate the same from each other and serving as separator during operation of the battery.

Furthermore, the present invention is also concerned with a storage battery which is originally assembled with only a single type active mass, such as an alkaline storage battery comprising, in combination, positive and negative terminal lead means spaced from each other, a porous active mass consisting essentially of $Co(OH)_2$ located between and contacting the spaced terminal lead means, an alkaline electrolyte fixed in the pores of the active mass, the active mass being adapted upon application of an electric potential to the terminal lead means to be transformed in the vicinity of the positive terminal lead means into $CoOOH$ as active mass of the polarity of the positive terminal lead means while forming an insulating layer of $Co(OH)_2$ adjacent the other of the terminal lead means, the insulating layer serving as separator during operation of the battery.

In addition to the foregoing, the present invention also proposes in a method of forming an alkaline storage battery, the steps of arranging two terminal leads spaced from each other in contact with one of two porous active masses of opposite polarity, respectively, the active masses contacting each other, fixing an alkaline electrolyte in the pores of the active masses, and applying an electric current to the two terminal leads so as to charge the active masses, whereby in the area of contact between the active masses an insulating layer will be formed, the insulating layer serving as separator between the active masses of opposite polarity during subsequent operation of the battery.

Surprisingly, applicants have found that in accordance with the present invention the incorporation of a separate element to serve as a porous separator in the alkaline storage battery can be avoided by arranging active masses such as an active positive and an active negative mass each forming part of the respective electrode, and having these active masses contacting each other. Upon charging of such battery arrangement, the active masses will form at their contacting faces an insulating layer which subsequently will serve as separator, i.e. will space the active positive mass from the active negative mass. The insulating layer is primarily formed of the portion of the positive active mass which is in contact with the negative active mass.

The thus formed insulating layer is very thin so that the battery of the present invention can be formed for instance with a total thickness of the positive active mass and the negative active mass, respectively, of between 0.5 mm. and 2 mm. In fact, particularly good results have been obtained with batteries in which positive and negative active masses each having a thickness of between 0.5 mm. and 2 mm. were arranged in contact with each other. However, the present invention, of course, is not to be considered limited to the above discussed preferred arrangement with respect to the thickness of the active masses.

Upon charging of the battery according to the present invention, such as a battery including a positive active mass and a negative active mass in contact with each other, the major portion of the positive active mass will be transformed, for instance, into higher states of oxidation of the nickel or cobalt compounds thereof, while the negative active mass will be subjected to reduction. However, the oxidation of the positive active mass of the positive electrode and the reduction of the negative active mass of the negative electrode will not occur evenly throughout the entire thickness of these active masses. To the contrary, the oxidation or reduction of active mass will start and will be most complete in the vicinity of the terminal leads of the respective electrode, while in the portions of the active masses farthest distant from the respective terminal leads, a layer of the active mass will remain in its initial uncharged, i.e. not oxidized or not reduced condition.

This unchanged layer which may consist for instance of uncharged cobalt oxide and/or uncharged nickel oxide will then act as separator. As stated above, it seems that this separating unchanged layer is formed primarily in the surface portion of the positive active mass which contacts the negative active mass. The contacting surface layer of the negative active mass seems to play only a minor role thereby, or not at all to participate in the forming of the separator layer. However, it is essential according to the present invention that at the contact area of the positive active mass of the positive electrode with the negative electrode, an uncharged separator layer is formed, regardless of whether or not active mass of the negative electrode participates in the formation of such separator layer.

The thus formed separator layer obviously is a porous layer since it is formed of the porous active mass, and formation of this porous separator layer will make it possible to eliminate the introduction of a spacing element, i.e. of a porous separator as a distinct and separate structural element.

Throughout the present application reference is made to terminal leads and terminal lead means. With these terms are meant the current conducting metallic portions of the electrodes, respectively, which form a continuous current conducting path from the electrodes of the battery to the terminals thereof at which the connection between an outside source or consumer of current is established.

The active masses of the battery arrangement according to the present invention may consist of the conventional cadmium mass for the negative electrode and the conventional nickel mass for the positive electrode. It is also possible to admix to the positive active mass in a manner known per se flakes or other particulate shapes of a current conducting material such as nickel flakes. However, when such current conducting particulate material is admixed to the positive active mass, it is important that such admixture take place only in the portion of the positive active mass which is spaced from the negative electrode so that the insulating layer which will be formed at the surface portion of the positive active mass which is in contact with the negative electrode, will be free of such current conducting particles. Obviously, the layer which will serve for separation of the positive and negative electrodes during operation of the battery must be free of current conducting material which might cause short-circuiting of the battery. The terminal leads may consist of for instance foils of metallic cadmium, nickel or the like.

When it is desired to produce batteries which are to serve mainly in order to maintain a static difference of potential between the positive and the negative terminal and which are not used as a source of current supply (or at least not to any appreciable extent) then it has been found practical and in certain cases advantageous, to use as active mass a mixture of positive and negative active mass which mixture is then placed between the positive and negative terminal leads, the terminal leads being spaced from each other but both contacting the composite active mass.

Furthermore, it is also possible according to the present invention to provide a battery arrangement in which the active mass located between and in contact with the two terminal leads consists of a single type mass such as cobalt hydroxide which then, during charging, will form the positive active mass and will also form an insulating separator layer adjacent to the negative terminal lead.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
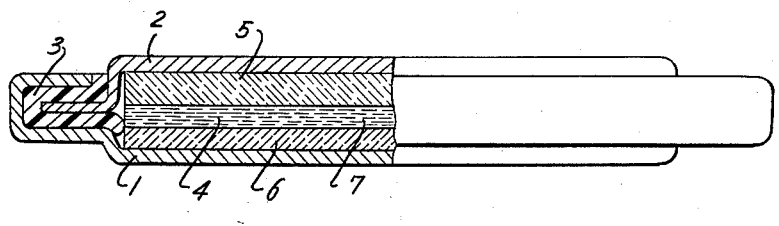
FIG. 1 is an elevational view, partially in cross section, of an alkaline storage battery of the so-called "button" type.

Referring now to the drawing, and particularly to FIG. 1, it will be seen that cup 1 forms the positive terminal and cover 2 forms the negative terminal. Cup 1 and cover 2 are insulated from each other by ring 3 made of synthetic insulating material. Ring 3, furthermore, serves for sealing the battery cell. Layer or pellet of nickel hydroxide 4 free of particulate conductive material is placed in the battery adjacent to cup 1. Pellet 5 consisting of cadmium powder or cadmium oxide is superposed on nickel hydroxide pellet 4. Both pellets are impregnated with aqueous potassium hydroxide. When the above described battery cell is charged with direct current, the portion of pellet 4 adjacent to cup 1 will form a layer 6 consisting of active nickel oxide compound, forming the active mass, while the cadmium oxide pellet 5 will be reduced to cadmium. Due to the fact that cadmium pellet 5 and nickel hydroxide pellet 4 contact each other, the contacting area and the adjacent surface layer 7 of nickel hydroxide pellet 4, will also be subjected to electrochemical reduction, in other words, the original nickel hydroxide of pellet 4 will be retained in the contacting area 7. The nickel hydroxide of layer 7 forms a substantially insulating layer and as such, will carry out the function of a separator. Upon discharge of the battery, the electrochemical reactions will take place in reverse order without substantial change in the non-conductive nickel hydroxide layer 7, while layer 6 will be reduced and layer 5 will be oxidized.

Figure 2:
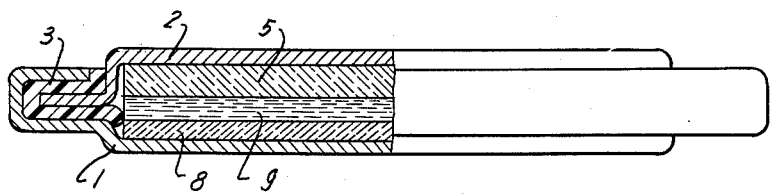
FIG. 2 is an elevational view partially in cross section of another embodiment of a "button" type storage battery according to the present invention.

According to the embodiment illustrated in FIG. 2, a tablet 8 consisting of a mixture of nickel hydroxide and of nickel flakes is interposed between cup 1 and a nickel hydroxide layer 9 which is free of such conductive particles. Thus, the positive active mass of the battery cell according to FIG. 2 will contain conductive metal particles in such portions thereof which will not serve to form the separator layer 7, while the portion of positive active mass 4 which is adjacent to negative active mass 5, will be free of such conductive particles.

Figure 3:
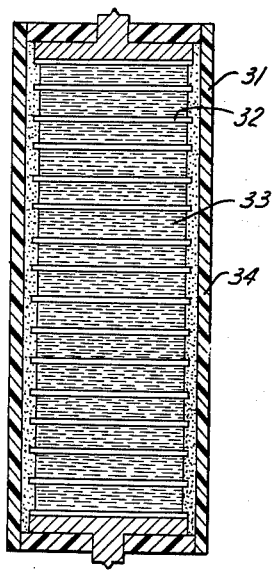
FIG. 3 is an elevational cross-sectional view of a battery column according to the present invention.

FIG. 3 illustrates a battery column such as is suitable for special purposes in which a static potential has to be maintained between the positive and negative pole, wherein, however, no current or at most only very little current is to be withdrawn from the battery. As shown in FIG. 3, alternating layers consisting of cadmium foils 2 and nickel hydroxide pellets 3 are arranged in a synthetic plastic tube 1. After impregnating the tablets with aqueous potassium hydroxide, the interstices between the column formed of layers 32 and 33, and the plastic tube 31 are filled with a hardenable resin 4 which is then allowed to harden. For this purpose, for instance, a non-conductive thermoplastic synthetic resin may be used which is introduced in liquid condition and allowed to harden by cooling to room temperature. The battery column is then charged in conventional manner with direct current. It does not matter which terminal lead will go to the positive terminal and which will go to the negative terminal.

It has been found, according to the present invention, that it is also possible to replace the cadmium foils of the battery column of FIG. 3 with nickel or other metal foils provided that the active mass pellets 33 consist ½ of a mixture of antipolar masses such as a mixture of nickel hydroxide and cadmium oxide. In such case, during charging an active nickel oxide compound will be formed of the nickel hydroxide adjacent to the positive nickel foil, while the cadmium oxide of the mixed active mass will remain unchanged. At the negative nickel foil, cadmium oxide will be reduced to metallic cadmium while the nickel hydroxide will remain unchanged. The intermediate layers between the layers of metallic cadmium and the layers of nickel oxide compound which are formed at opposite sides of the active mass pellets 33, will form the separator. Thus, a single mixture consisting of positive active mass and negative active mass, when in contact with positive and negative terminal leads, will carry out the complete function of the galvanic cell, including the function of the porous separator. The column illustrated in FIG. 3 is primarily useful for batteries which are to maintain a potential but which are not supposed to be used as a source of electric energy. However, it is also possible to withdraw relatively small amounts of electric current from such battery column. It is immaterial which of the terminals of the battery column is during charging connected with the positive or the negative terminal of a source of current.

Figure 4:
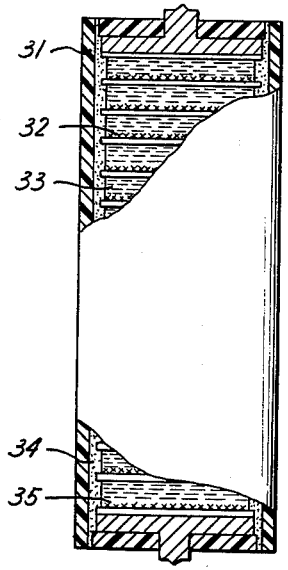
FIGS. 4 and 5 are fragmentary elevational cross-sectional views of the battery illustrated in FIG. 3 and will serve to illustrate certain operating conditions.
Figure 5:
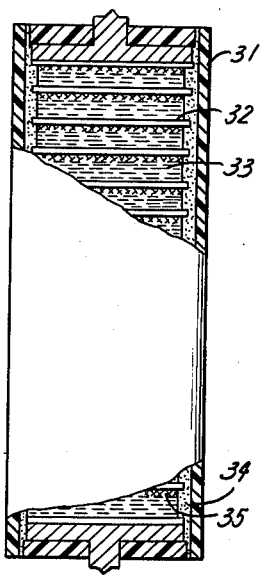

The operating conditions of the column according to FIG. 3 are further illustrated in FIGS. 4 and 5. As can be seen therein, the insulating or separator layer 5 of the respective oxide will be formed under all circumstances adjacent to the negative terminal lead, irrespective of the manner in which the column is charged, i.e. irrespective of whether the upper or the lower terminal will be the positive terminal of the column. Such voltage maintaining columns can also be used for stabilizing direct current, provided that the current load is relatively small.

Figure 6:
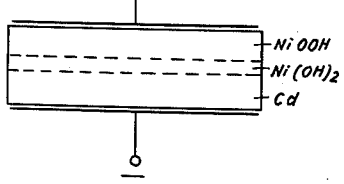
FIGS. 6-8 are schematic elevational views which are to serve to illustrate the electrochemical reactions which will take place upon charging of three different embodiments of battery arrangements according to the present invention.

FIG. 6 is a schematic illustration of an alkaline storage battery cell. In this case, the uncharged active masses consist of $Cd(OH)_2$ and $Ni(OH)_2$. During charging, the positive mass is oxidized to $NiOOH$ and the negative mass is reduced to metallic cadmium. Upon incomplete charging of the cell, the border layer of the positive active mass which contacts the negative active mass will remain in its original state, namely as $Ni(OH)_2$ and this layer will then act as porous separator. The negative electrode may be completely reduced to metallic cadmium or the negative electrode may retain in its border layer adjacent the positive electrode a poorly conductive layer of $Cd(OH)_2$, which border layer of the negative active mass will then form an additional separator layer.

Figure 7:
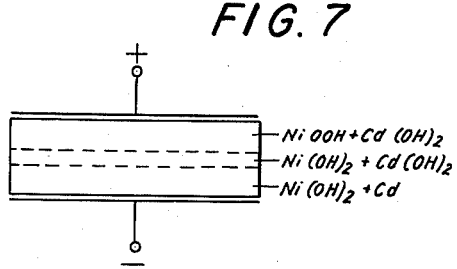

According to FIG. 7, a pellet consisting of a mixture of positive active mass and negative active mass will be used, i.e. a pellet which in uncharged condition consists of a mixture of $Cd(OH)_2$ and $Ni(OH)_2$. Upon charging of such cell, the mixed active mass nearer to the positive terminal lead will be transformed into a mixture of $NiOOH$ and $Cd(OH)_2$. Simultaneously, in the vicinity of the negative terminal lead, the mixture will be reduced to $Ni(OH)_2$ and metallic cadmium. Approximately semidistant from the two terminal leads, there will remain a layer of unreacted, uncharged active mass consisting of $Ni(OH)_2$ and $Cd(OH)_2$ which layer will serve as separator.

Figure 8:
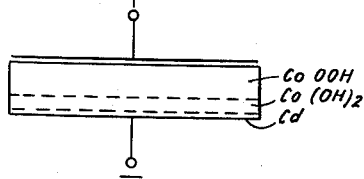

According to FIG. 8, a so-called single component system is shown in which the entire active mass consists of a single compound which in uncharged condition may be for instance $Co(OH)_2$. The uncharged active mass will be oxidized starting with the immediate vicinity of the positive terminal lead, into a higher cobalt hydroxide such as $CoOOH$. In case the pellet is not completely oxidized throughout, an insulating layer of $Co(OH)_2$ will remain adjacent to the negative terminal lead and this insulating layer will form the separator. The terminal leads are made of cadmium foils. In such batteries, the negative terminal lead i.e. the cadmium foil serving as the negative terminal lead represents the entire negative electrode, while the active mass of higher cobalt oxides in combination with the positive terminal lead represents the positive electrode. Since the negative electrode for all practical purposes is free of capacity to store electrical energy, such cells are useful for batteries which are to maintain a certain potential but which will not have to supply electrical current.

Referring now again to FIG. 6, if the negative active mass is completely reduced and the positive active mass is completely oxidized, i.e. if the cell is completely charged, then at the contacting faces of the positive and negative active masses, a reaction will take place between the metallic cadmium and the $NiOOH$ of the positive mass, resulting in the formation of $Ni(OH)_2$. In this case, it could be said that the separator layer is not retained from the original uncharged mass but is newly formed by the above described reaction. A similar reaction can also take place according to the embodiment discussed in connection with FIG. 7, whereby such reaction will take place at the layer between the completely reduced negative mass and the completely oxidized positive mass. Thus, the separator formed of active mass according to the present invention may either be present due to the fact that a layer of the active mass is retained in uncharged condition, or that such layer is formed during charging of the battery as described above.

As described above, it is possible according to the present invention to produce a galvanic cell by positioning between the terminal leads a material which during the charging will form by oxidation and reduction electrochemically active layers. Thus, it is also possible to produce a storage battery which consists of a single-component active mass system and terminal leads. For instance, if a pellet of cobalt hydroxide which has been impregnated with electrolyte, is placed between the two terminal leads, then during charging a layer of higher cobalt oxides will be formed at the positive terminal lead, while at the negative terminal lead a layer of cobalt metal will be formed. Intermediate these two uniform layers, a layer of cobalt hydroxide, i.e., a layer in the condition of the uncharged material, will be retained and will act as separator. Such a single component system battery can be used primarily to maintain a potential but may also serve as a source of small amounts of current.

According to the invention, the active mass of the electrodes is simultaneously also used for the purpose of separating the charged active masses from each other. Thus, primarily active masses will be advantageously used according to the present invention which form oxides of poor electric conductivity so that the uncharged particles of the active mass will serve as a separator.

A battery cell which contains a single component mass between the terminal leads or which contains a mixture of positive and negative active mass between the terminal leads may for instance be used for applying currents of up to 5 milliamperes. This figure is based on pellets of 20 mm. diameter and 1 mm. thickness.

Battery cells according to the present invention which contain the conventional active masses such as nickel hydroxide and cadmium mass and which form separator layers at the contacting areas between the positive active mass and the negative active mass, may be used—after formation of the separator layer by charging of the battery—for supplying currents of conventional magnitude. It must be emphasized that the present invention can also be advantageously employed in connection with hermetically sealed alkaline storage batteries.

By way of example, and referring to FIG. 1 of the drawing, positive active mass pellet 4 may consist of 0.7 g. nickel hydroxide free of particulate current conducting material. The thickness of such pellet will be about 1 mm. and its diameter about 20 mm. The superposed negative pellet 5 will consist of 0.7 g. cadmium oxide and may contain the conventional admixture of current conducting particles. The thickness of the cadmium oxide tablet will be 0.7 mm. and the two superposed pellets will be impregnated with 250 mg. of aqueous potassium hydroxide having a density of 1.20. This cell when operated in sealed condition gives a capacity of 40 milliampere hours and a current of 5 milliamperes.

In principle, it should also be possible to use the negative active mass for forming the separator layer. However, the cadmium oxides or hydroxides which are formed thereby possess a lower electrical resistance than the nickel hydroxides which are primarily proposed according to the present invention. It follows that a separator formed of the border layer of the negative active mass will have inferior insulating properties as compared with a separator layer formed of positive active mass.

The battery column of FIGS. 3–5 can be considered as a modification of a volta column. The single element of this column consists of a nickel hydroxide tablet which is placed between two metallic cadmium foils. The pellet is impregnated with aqueous potassium hydroxide. When a direct current is applied to the cadmium foils of such cell, then the nickel hydroxides will be oxidized at the positive terminals, while at the negative terminals due to the reducing effect, the nickel hydroxide will remain in its original condition and will thus form a separator layer between the negative cadmium foils and the oxidized active mass at the positive cadmium foils. The cell will have the voltage of a normal nickel cadmium cell. If such cells are superposed upon each other and the cadmium foils which thereby would be in contact with each other are replaced by single cadmium foils, one will arrive at the arrangement illustrated in FIG. 3. It can be said that the cadmium foils of this column operate on one face as terminal lead to the nickel hydroxide and on the other face as negative cadmium electrode.

Since the active surface of the cadmium foil is very small, the column of FIG. 3 is primarily suitable as a static source of a potential difference for instance for the charging of electrometers, or for providing the grid potential of vacuum tubes.

A column which contains a pellet consisting of a mixture of nickel hydroxide and cadmium oxide operates in a substantially similar manner. However, the interposed nickel foils would then serve exclusively as terminal leads.

The capacity of the single component system (cobalt hydroxide between two terminal leads) is limited by the low electrochemical activity of the higher cobalt oxide which is formed at the positive terminal during charging of the cell.

It will be clear from the foregoing that the method of the present invention is preferably carried out by arranging the active mass between terminal leads and charging the active mass in such a manner that a portion thereof will form an insulating layer serving a separator as more fully described above.

*Example.*—According to FIGURE 1 the positive electrode consists of 0.5 gr. nickel-hydroxide $Ni(OH)_2$ which is pressed to a tablet with a diameter of 22 mm. and a thickness of about 0.5 mm.

In the same manner 0.7 gr. cadmium oxide CdO are pressed to a tablet of the same size. Both tablets are posed upon one another and built into a container according to FIGURE 1. Before closing the cell container the tablets receive 0.2 gr. potassium hydroxide electrolyte of the specific gravity 1.20 gr./cm.$^3$.

After closing the cell will be charged during the first formation by a current of 4 ma. during 20 hours. After this formation the cell can be discharged by a current of 5 ma. according to a capacity of 40 ma. h.

It will be understood that each of the elements described above, or two or more together, may also find a useful application in other types of storage batteries differing from the types described above.

While the invention has been illustrated and described as embodied in a hermetically sealed alkaline storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an alkaline storage battery, in combination, a pair of electrodes of opposite polarity the positive electrode of said pair of electrodes including active nickel mass and the negative electrode of said pair of electrodes including active cadmium mass and the active masses of said positive and negative electrodes directly contacting each other; and an alkaline electrolyte fixed in the active masses of said electrodes, whereby upon charging of said battery an insulating layer will be formed in the area of contact of said positive and negative active masses, said insulating layer serving as separator between said electrodes of opposite polarity during operation of said battery.

2. An alkaline storage battery, comprising, in combination a housing; positive and negative electrodes located in said housing adjacent to each other, said positive electrode including porous active nickel mass and said negative electrode including porous active cadmium mass and terminal lead means for passing electric current from and to said electrodes, respectively; an alkaline electrolyte fixed in the pores of the active masses of said positive and negative electrodes, said active masses of said positive and negative electrodes directly contacting each other, whereby upon charging of said battery an insulating layer will be formed in the area of contact of said positive and negative active masses, said insulating layer serving as separator between said electrodes of opposite polarity.

3. An alkaline storage battery, comprising, in combination, a housing; positive and negative electrodes located in said housing adjacent to each other, said positive electrode including porous active nickel mass and said negative electrode including porous active cadmium mass and each of said electrodes including a terminal lead means for passing electric current from and to said electrode; an alkaline electrolyte fixed in the pores of the active masses of said positive and negative electrodes, said active masses of said positive and negative electrodes directly contacting each other, whereby upon charging of said battery an insulating layer consisting mainly of $Ni(OH)_2$ will be formed in the area of contact of said positive and negative active masses, said insulating layer serving as separator between said electrodes of opposite polarity.

4. An alkaline storage battery, comprising, in combination a housing; positive and negative electrodes located in said housing adjacent to each other, said positive electrode including porous active nickel mass and said negative electrode including porous active cadmium mass and terminal lead means for passing electric current from and to said electrodes, respectively; an alkaline electrolyte fixed in the pores of the active masses of said positive and negative electrodes, each of said active masses of said positive and negative electrodes consisting of a main portion spaced from the active mass of the electrode of opposite polarity and of a terminal portion, said terminal portions of said active masses of said positive and negative electrodes directly contacting each other, whereby upon charging of said battery an insulating layer will be formed in the area of contact of said positive and negative active masses, said insulating layer serving as separator between said electrodes of opposite polarity.

5. An alkaline storage battery, comprising, in combination, a housing; positive and negative electrodes located in said housing adjacent to each other, each of said positive electrode including porous active nickel mass and said negative electrode including porous active cadmium mass and terminal lead means for passing electric current from and to said electrodes, respectively; an alkaline electrolyte fixed in the pores of the active masses of said positive and negative electrodes, each of said active masses of said positive and negative electrodes consisting of a main portion spaced from the active mass of the electrode of opposite polarity and of a terminal portion, the main portion of at least one of said active masses including current conducting particles dispersed therethrough and said terminal portions of said active masses being free of said current conducting particles, said terminal portions of said active masses of said positive and negative electrodes directly contacting each other, whereby upon charging of said battery an insulating layer will be formed in the area of contact of said positive and negative active masses, said insulating layer serving as separator between said electrodes of opposite polarity.

6. An alkaline storage battery, comprising, in combination, a housing; positive and negative electrodes located in said housing adjacent to each other, each of said positive electrode including porous active nickel mass and said negative electrode including porous active cadmium mass and terminal lead means for passing electric current from and to said electrodes, respectively; an alkaline electrolyte fixed in the pores of the active masses of said positive and negative electrodes, each of said active masses of said positive and negative electrodes consisting of a main portion spaced from the active mass of the electrode of opposite polarity and of a terminal portion, the main portion of at least one of said active masses including current conducting nickel flakes dispersed therethrough and said terminal portions of said active masses being free of said current conducting nickel flakes, said terminal portions of said active masses of said positive and negative electrodes directly contacting each other, whereby upon charging of said battery an insulating layer will be formed in the area of contact of said positive and negative active masses, said insulating layer serving as separator between said electrodes of opposite polarity.

7. A hermetically sealed alkaline storage battery, comprising, in combination, a hermetically sealed housing; positive and negative electrodes located in said housing adjacent to each other, said positive electrode including porous active nickel mass and said negative electrode including porous active cadmium mass and terminal lead means for passing electric current from and to said electrodes, respectively; an alkaline electrolyte fixed in the pores of the active masses of said positive and negative electrodes, said active masses of said positive and negative electrodes directly contacting each other, whereby upon charging of said battery an insulating layer will be formed in the area of contact of said positive and negative active masses, said insulating layer serving as separator between said electrodes of opposite polarity.

8. An alkaline storage battery, comprising, in combination, a housing; positive and negative electrodes located in said housing adjacent to each other, said positive electrode including porous active nickel mass and said negative electrode including porous active cadmium mass and terminal lead means including a metal foil made of metal selected from the group consisting of cadmium and nickel for passing electric current from and to said electrodes, respectively; an alkaline electrolyte fixed in the pores of the active masses of said positive and negative electrodes, said active masses of said positive and negative electrodes directly contacting each other so that upon charging of said battery an insulating layer will be formed in the area of contact of said positive and negative active masses, said insulating layer serving as separator between said electrodes of opposite polarity.

9. An alkaline storage battery, comprising, in combination, a housing; positive and negative terminal lead means spaced from each other and at least partially located within said housing; an active mass located in said housing and contacting said spaced positive and negative terminal lead means, said active mass being porous and consisting of a mixture of $Ni(OH)_2$ and $Cd(OH)_2$; an alkaline electrolyte fixed in the pores of said active mass, whereby upon charging of said battery the portion of said active mass in the vicinity of said positive terminal lead means will be transformed into a mixture of NiOOH and $Cd(OH)_2$, the portion in the vicinity of said negative terminal lead means will be transformed into a mixture of $Ni(OH)_2$ and Cd, and an insulating layer consisting essentially of a mixture of $Cd(OH)_2$ and $Ni(OH)_2$ will remain located between said portions so as to separate the same from each other and serving as separator during operation of said battery.

10. In a rechargeable electric battery, in combination, positive terminal lead means; negative terminal lead means constituting the negative electrode and arranged spaced from said positive terminal lead means; and a porous active mass located between and contacting said spaced terminal lead means and having an alkaline electrolyte fixed in the pores thereof, said porous active mass consisting at least in the vicinity of said positive terminal lead means substantially of CoOOH, and consisting adjacent to said negative terminal lead means of $Co(OH)_2$ serving also as separator during operation of the battery.

11. In an alkaline storage battery, in combination, a pair of electrodes of opposite polarity, the positive electrode including active nickel mass and the negative electrode including active cadmium mass, said active masses of said electrodes of opposite polarity facing each other; an alkaline electrolyte fixed in the active masses of said electrodes; and a layer consisting of one of said active masses in uncharged condition interposed between and directly contacting said active masses of said electrodes of opposite polarity, said layer serving as separator during operation of said battery.

12. In an alkaline storage battery, in combination, a pair of electrodes of opposite polarity, the positive electrode including charged active nickel mass and the negative electrode including charged active cadmium mass, said active masses of said electrodes of opposite polarity facing each other; an alkaline electrolyte fixed in the active masses of said electrodes; and a layer consisting of one of said active masses in uncharged condition interposed between and directly contacting said active masses of said electrodes of opposite polarity, said layer serving as separator during operation of said battery.

13. An alkaline storage battery, comprising, in combination, a housing; positive and negative electrodes located in said housing adjacent to each other, each of said positive and negative electrodes including porous active mass and a terminal lead means for passing electric current from and to said electrode, said active mass of said positive electrode being nickel mass and said active mass of said negative electrode being cadmium mass; an alkaline electrolyte fixed in the pores of the active masses of said positive and negative electrodes, said active masses of said positive and negative electrodes facing each other; and an insulating layer comprising one of said active masses in uncharged condition interposed between and directly contacting said active masses of opposite polarity, said insulating layer serving as separator between said electrodes of opposite polarity.

14. In a method of forming an alkaline storage battery, the steps of arranging two terminal leads spaced from each other and each in contact with a different one of two porous active masses of opposite polarity, respectively, said active mass of positive polarity being nickel mass and said active mass of negative polarity being cadmium mass, said active masses directly contacting each other; fixing an alkaline electrolyte in the pores of said active masses; and applying an electric current to said two terminal leads so as to charge said active masses, whereby in the area of contact between said active masses of opposite polarity an insulating layer will be formed, said insulating layer serving as separator between said active masses of opposite polarity during subsequent operation of said battery.

References Cited in the file of this patent
UNITED STATES PATENTS

| | | |
|---|---|---|
| 692,507 | Edison | Feb. 4, 1902 |
| 2,174,840 | Robinson et al. | Oct. 3, 1939 |
| 2,708,211 | Koren et al. | May 10, 1955 |
| 2,934,580 | Neumann | Apr. 26, 1960 |